US010179712B2

(12) United States Patent
Vollmar et al.

(10) Patent No.: US 10,179,712 B2
(45) Date of Patent: Jan. 15, 2019

(54) TOWABLE DOCK-LIFT TRAILER

(71) Applicant: Superior Handling Equipment, LLC, Ormond Beach, FL (US)

(72) Inventors: Michael S. Vollmar, Ormond Beach, FL (US); Robert A. Johnson, Port Orange, FL (US); Carl Eugene Barbour, Ormond Beach, FL (US); Harley James Barbour, Ormond Beach, FL (US); Gary Clark, Ormond Beach, FL (US); Michael Kocur, Daytona Beach, FL (US)

(73) Assignee: SUPERIOR HANDLING EQUIPMENT, LLC, Ormond Beach, FL (US)

( * ) Notice: Subject to any disclaimer, the term of this patent is extended or adjusted under 35 U.S.C. 154(b) by 0 days.

(21) Appl. No.: 15/594,573

(22) Filed: May 13, 2017

(65) Prior Publication Data
US 2018/0044124 A1 Feb. 15, 2018

Related U.S. Application Data

(60) Provisional application No. 62/373,023, filed on Aug. 10, 2016.

(51) Int. Cl.
*B60P 1/02* (2006.01)
*B65G 69/24* (2006.01)
*B60P 1/43* (2006.01)

(52) U.S. Cl.
CPC .............. *B65G 69/24* (2013.01); *B60P 1/025* (2013.01); *B60P 1/435* (2013.01)

(58) Field of Classification Search
CPC .. B60P 1/02; B60P 1/025; B60P 1/435; B64F 1/32; B66F 7/0625; B65G 69/24
See application file for complete search history.

(56) References Cited

U.S. PATENT DOCUMENTS

| 3,220,698 | A |   | 11/1965 | Carder |                    |
|-----------|---|---|---------|--------|--------------------|
| 3,341,042 | A | * | 9/1967  | Carder | B64F 1/32  182/148 |

(Continued)

*Primary Examiner* — Kaitlin S Joerger
(74) *Attorney, Agent, or Firm* — Marc S. Kaufman; Rimon, P.C.

(57) ABSTRACT

A highway towable dock-lift trailer for use in loading and/or unloading trucks, rail cars, containers, etc., for example, in any location and across all industries and applications, and can include a tow bar that allows the trailer be towed to a desirable position or location. When the tow bar is removed from the trailer or repositioned relative to the frame, either a truck can back into position or the trailer lift can be positioned against the truck, etc., and the trailer lift is then ready to load and/or offload the truck. As an operator elevates the loading platform of the trailer, via hydraulic lifting means, for example, the lift can move up to truck height and hydraulically operated lifting arms can operate opposed automatic folding ramps, which simultaneously can open for load distribution and close for safety. The trailer can include a plurality of screw down or hydraulically actuated jacks to level and secure the platform, and the trailer can include bumpers to absorb the forces from a truck accidentally impacting the trailer.

20 Claims, 13 Drawing Sheets

(56) References Cited

U.S. PATENT DOCUMENTS

| | | | | |
|---|---|---|---|---|
| 3,991,857 | A * | 11/1976 | Wolk | B66F 7/065 |
| | | | | 187/269 |
| 4,901,980 | A * | 2/1990 | Hansen | B25H 1/0007 |
| | | | | 254/124 |
| 4,923,357 | A * | 5/1990 | Isogai | B65G 69/24 |
| | | | | 14/71.3 |
| 4,979,592 | A * | 12/1990 | Isogai | B65G 69/24 |
| | | | | 187/217 |
| 5,275,526 | A * | 1/1994 | Moseley | B65G 69/24 |
| | | | | 414/495 |
| 6,357,990 | B1 * | 3/2002 | Moseley | B65G 69/24 |
| | | | | 14/72.5 |
| 6,409,455 | B2 * | 6/2002 | Moseley | B66F 9/04 |
| | | | | 254/10 R |
| 6,460,653 | B1 * | 10/2002 | Hardy | A01M 31/02 |
| | | | | 182/63.1 |
| 6,648,578 | B1 * | 11/2003 | Rouse | B60P 1/02 |
| | | | | 280/414.1 |
| 6,789,829 | B1 * | 9/2004 | Kapels | B62D 33/02 |
| | | | | 296/11 |
| 9,340,138 | B2 * | 5/2016 | Piekny | B60P 1/34 |
| 2003/0127827 | A1 * | 7/2003 | Hulsey | B60D 1/52 |
| | | | | 280/491.3 |
| 2008/0211289 | A1 * | 9/2008 | Beiler | B60P 1/00 |
| | | | | 298/19 R |
| 2012/0020762 | A1 * | 1/2012 | Roose | B60P 1/025 |
| | | | | 414/495 |
| 2016/0167558 | A1 * | 6/2016 | Beiler | B60P 1/003 |
| | | | | 414/483 |

* cited by examiner

TOWABLE DOCK-LIFT TRAILER

BACKGROUND

Trucks and other vehicles used to transport equipment, supplies, cargo, etc. are presently loaded and/or offloaded by one or more of a variety of prior art methods. Where a fixed truck dock is not available, these methods include by hand, by fork-lift (which may only reach part way into the truck), and by a truck lift-gate (e.g., which are included on special trucks). Each of these options can be difficult to use with safety concerns, and/or can consume a significant amount of time to complete a loading/offloading task. Lift gates can be effective, though they are often slow to offload and only come with a unique, specialized truck.

A scissor-lift apparatus, such as that disclosed in U.S. Pat. No. 3,220,698, is another prior art method for unloading or loading. This type of apparatus is commercially available. Superior Handling Equipment of Ormond Beach, Fla. manufactures a different type of lift, sometimes referred to as hydraulic parallelogram lift, or a "dock-lift". While prior art scissor-lifts and hydraulic parallelogram lifts are useful in a fixed or relatively immobile location, they must be transported by truck and offloaded into the immediate area where they are to be used and usually anchored. Each can be beneficial in certain circumstances, but not being particularly mobile, they can be difficult or impossible to move long distances or at high rates of speed. U.S. Pat. No. 6,357,990 discloses a "wheeled elevator" that can move between loading and unloading locations. However, the wheels are designed for moving the device across smooth surfaces over short distances. The design is not suitable for towing over roads and rough terrain.

For example, many locations, such as disaster aid areas and remote locations do not have adequate infrastructure to allow access by large trucks needed to transport such equipment as a dock-lift. In such instances, it can be difficult, if not impossible to transport loading equipment to the desired location.

The presently disclosed technology overcomes the above-identified disadvantages of the prior art, and accomplishes the above and other objectives such as allowing a dock-lift to be transported anywhere that loading/unloading is required.

BRIEF SUMMARY

In one embodiment, the present disclosure is directed generally to a lift trailer used to load and/or offload freight/equipment onto or from a highway truck or transportation unit (such as a rail car, container, etc.)—hereafter collectively referred to as a "truck." The trailer can be towed to a variety of structures and/or locations, such as a building, a parking lot, a field, a military transport or a FEMA disaster location. A trailered lift can be deployed anywhere goods need to be moved. Automatic folding ramps, that enable the trailer's material handling capability, can be operated by pushing a lever(s) to fold and/or unfold the ramps into the required loading/unloading positions.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION OF THE INVENTION

Figure 1:
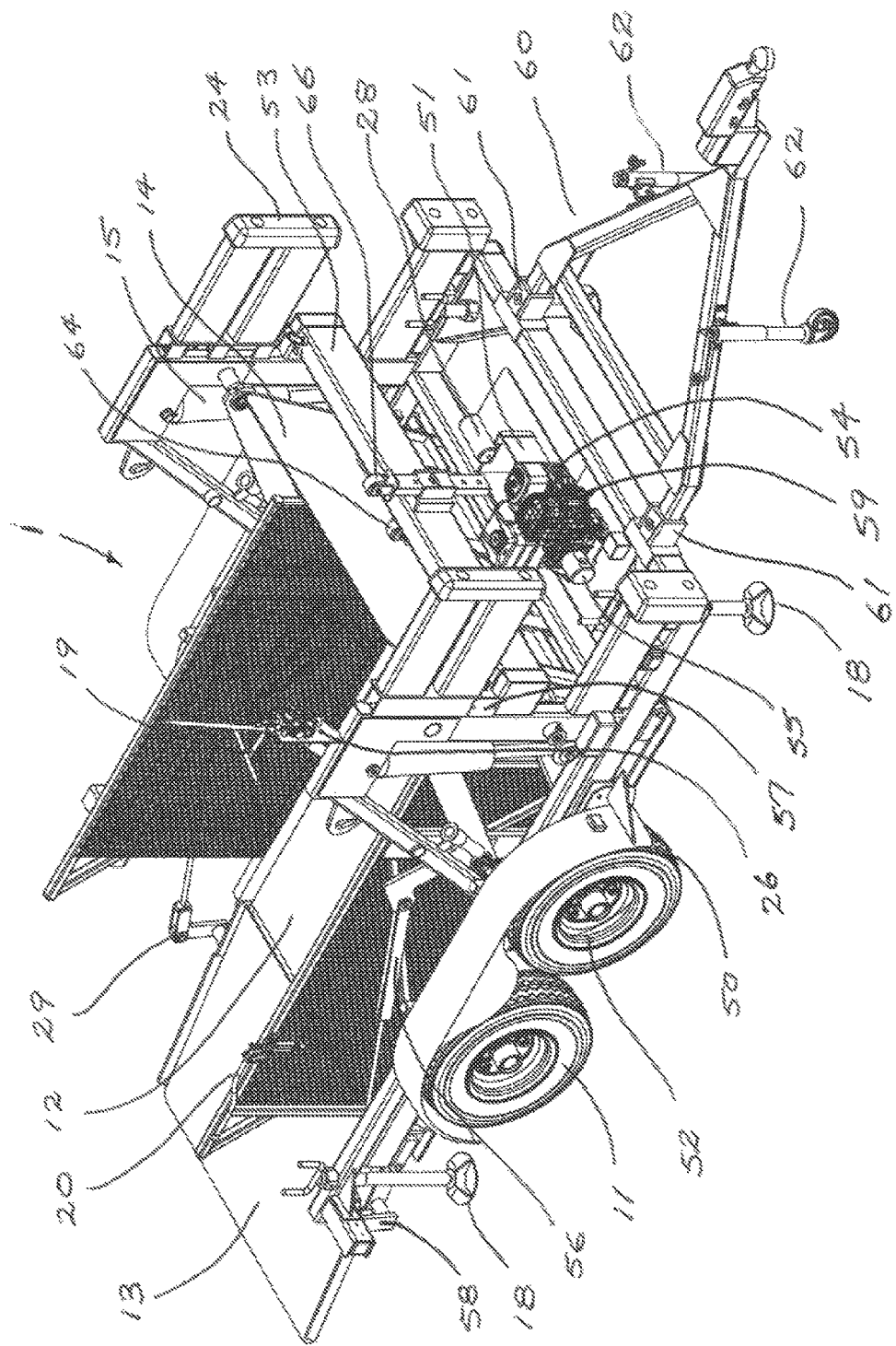
FIG. 1 is an perspective view of a system or apparatus according to an embodiment of the present disclosure, wherein a rear ramp is shown in a lowered configuration and a front ramp is shown in a raised configuration.

Certain terminology is used in the following description for convenience only and is not limiting. The words "bottom," "top," "lower" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

Modern day transportation of freight over long distances normally begins and ends at a facility typically equipped with a dock. A dock is well-known as an elevated platform, typically made of wood, concrete, and/or steel, to which a truck can back up, open its cargo doors such that the freight can be transferred from the truck onto the dock or into the facility for storage until it can be transferred to its intended destination. Because there are no rigid rules or regulations about the height, shape or size of the dock, there are all sizes and shapes of docks. Furthermore, there are many heights and sizes and shapes of trucks that deliver freight to and from docks.

Accordingly, there is a need to provide a highway-grade apparatus that can assist with loading and unloading trucks of different heights and sizes onto and from docks of different heights and sizes. Prior to the presently disclosed technology, a practical loading/unloading apparatus that is able to be towed or pulled at high speeds and over long distances on a highway has yet to be developed.

Generally, freight is handled by hand trucks or powered trucks, such as fork-lift trucks, so as to use as little time as possible and as few humans as possible. In order to accomplish these purposes dock boards and dock levelers of many types have been used for many years to provide a bridge that is moderately adjustable in height to provide a smooth rolling surface to connect the dock with the inside floor of the truck. In many instances in the past, such a smooth connector has not been available to adequately bridge the range of various truck heights for loading or unloading step-wise, e.g., (1) from the truck bed to the ground or dock and (2) from the ground to space available inside a facility, which might entail an intermediate step of lifting the freight up and onto a dock before moving it inside the facility for temporary storage. If the dock surface is sufficiently large to permit an elevator apparatus on the dock, such as those of applicant's previously mentioned patents, it might be relatively easy to unload the truck that could back up to that elevator apparatus positioned on the dock surface. If the dock was restricted in dock surface area, and the truck approach space is insufficient to position the elevator apparatus in front of the dock, the truck might have to be unloaded in the truck parking area and the freight separately and inefficiently transferred to the dock.

It is an objective of the presently disclosed technology to provide an elevator apparatus, which is able to be towed or moved on a highway or other road at relatively high speeds (e.g., 60 miles per hour or more) and includes automatic folding ramps on either side thereof. Such an apparatus can solve many of the freight transfer problems in instances where docks and trucks are ill-matched for freight transfer using previously available means by positioning a portion of the elevator on the dock surface and the remainder in front of the dock. Such an apparatus can also be used to load/unload a truck in the absence of a dock.

In one embodiment, the present disclosure is directed to a highway rated, towable dock-lift trailer. The trailer allows all types and sizes of trucks to be loaded and offloaded at virtually any location across all markets. The trailer can include an integrated lift, and the combination can be towed into a desired position or location. The trailer can be used where an unloading dock is either not available or may not be deep enough to support a stationary elevator platform apparatus and yet an elevator is needed to reach the truck height safely and efficiently. A tow bar can be repositioned, anchoring/positioning jacks can be screwed down or hydraulically deployed, and then trucks can be easily offloaded with the push of a lever to operate an automatic ramp that can fold into the truck while an opposing ramp closes for the safety of the operator and protection of the load during handling. The synchronized movement of each ramp is achieved automatically. The trailer of the present disclosure is configured to support and/or move up incremental loads from 4,000 to 25,000 pounds.

The trailer of the presently disclosed technology can be made to stand up to heavy truck impact, and is robust and durable. The disclosed technology uses a parallelogram lifting design that has many key design features representing a significant performance and safety advantage over the only competing dock-lift technology, the generic scissor-lift. The parallelogram design, which is generally disclosed in U.S. Pat. No. 6,357,990, and is herein incorporated by reference in its entirety, is inherently safer and faster than a scissor lift design.

Figure 5:
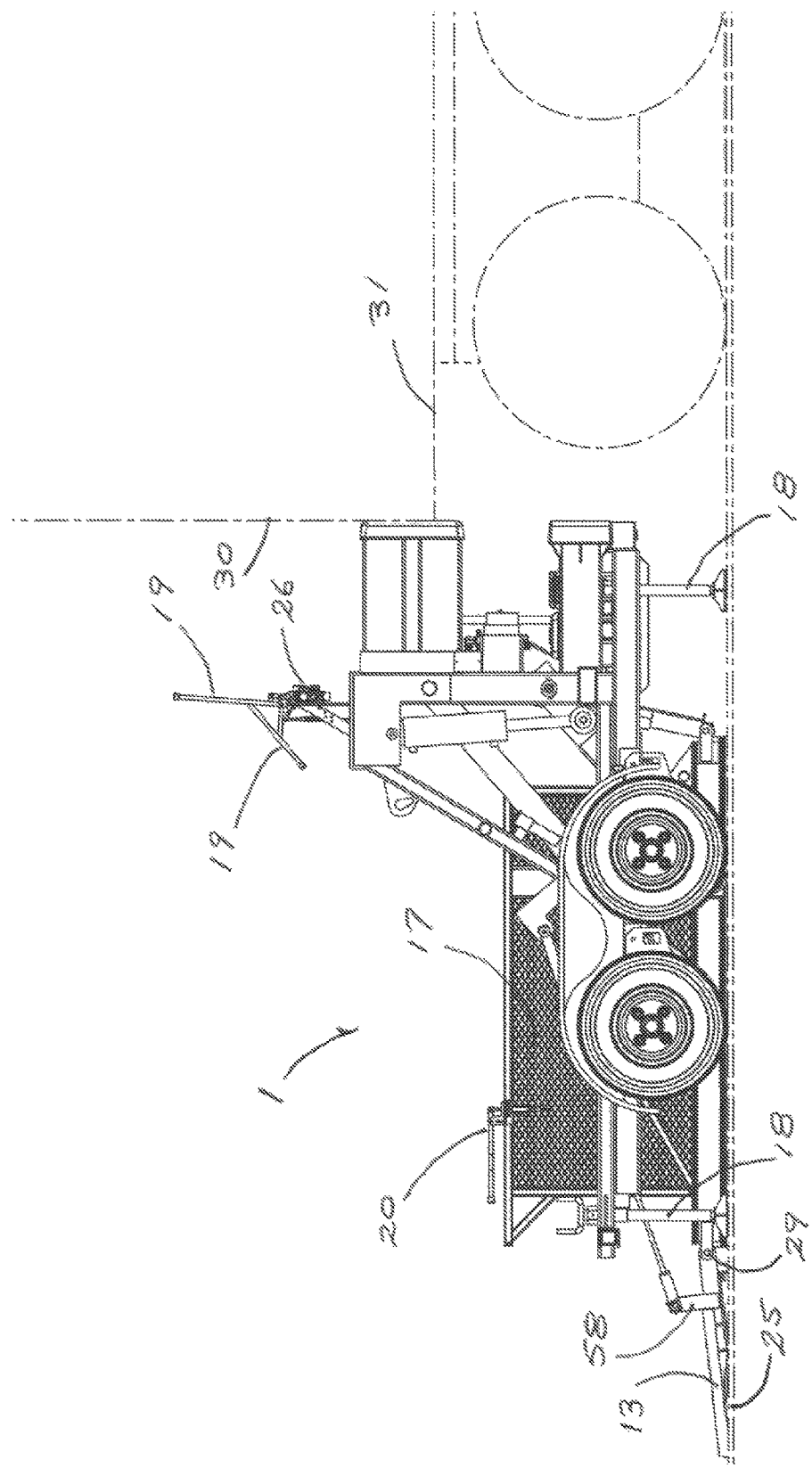
FIG. 5 is another side elevation view of the system shown in FIG. 1, wherein the system is in a loading configuration.

FIGS. 1-13 show an embodiment of a trailer or elevator apparatus, generally designated 1, which can be moved or rolled into position to provide a bridge between a low dock, or ground, and a normally higher truck for the transfer of freight there between. In this situation, a highway truck can include a rear edge 30 and a truck floor 31 (see FIG. 5). The elevator apparatus 1 can include frame 10 having a truck-end ramp or bridge 14 and dock-end ramp 13 connected to the elevatable platform 12 (see FIG. 6). Freight on the truck can be unloaded by moving it across ramp 14 to platform 12 in its elevated position. Platform 12 can then be lowered such that the freight can be moved across ramp 13 to dock or ground level 25 (see FIG. 5), which can be level with the facility floor (not shown). In the prior art, the freight is normally moved by hand truck, pallet and hand pallet jack, electric powered pallet jack or truck (e.g., a fork lift motorized truck), or by any other means available.

Figure 2:
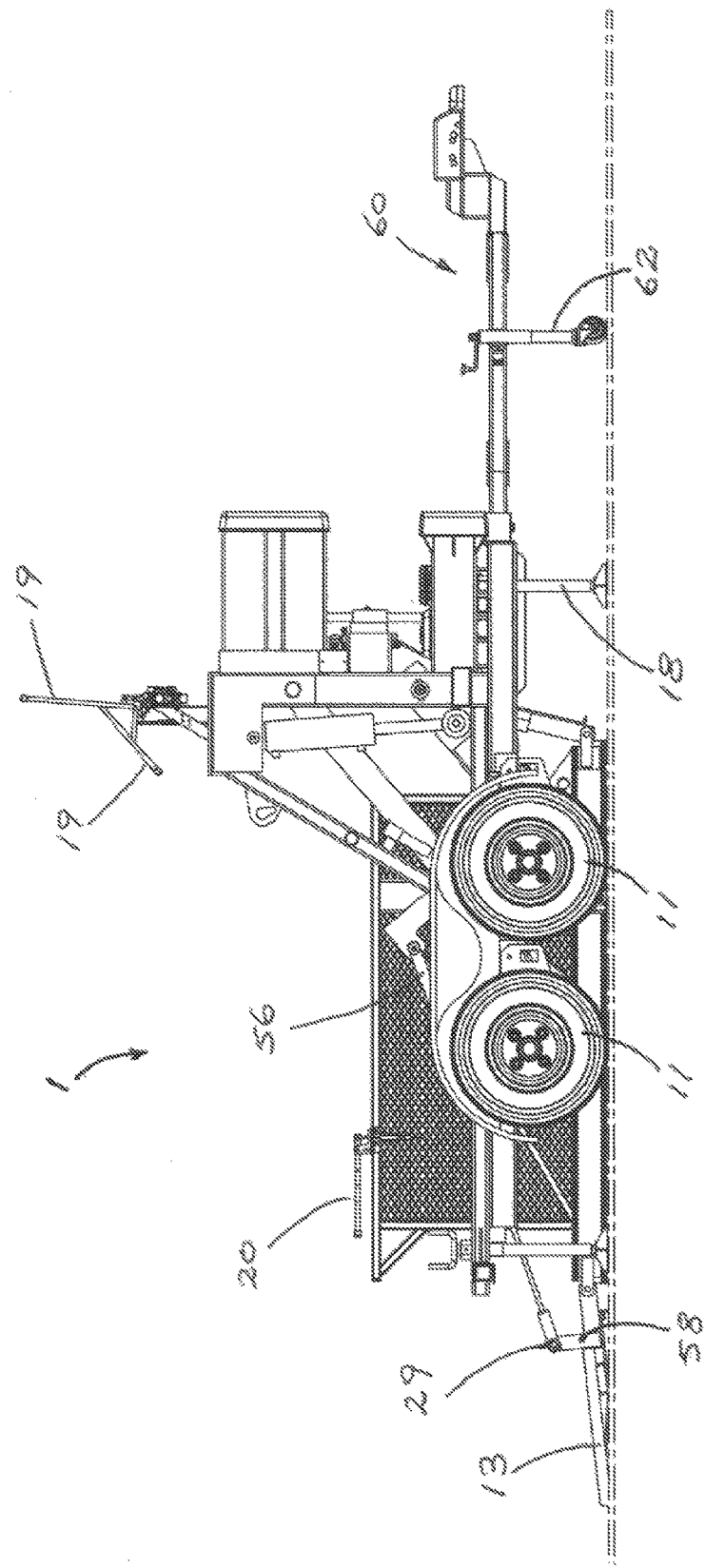
FIG. 2 is a side elevation view of the system shown in FIG. 1.
Figure 6:
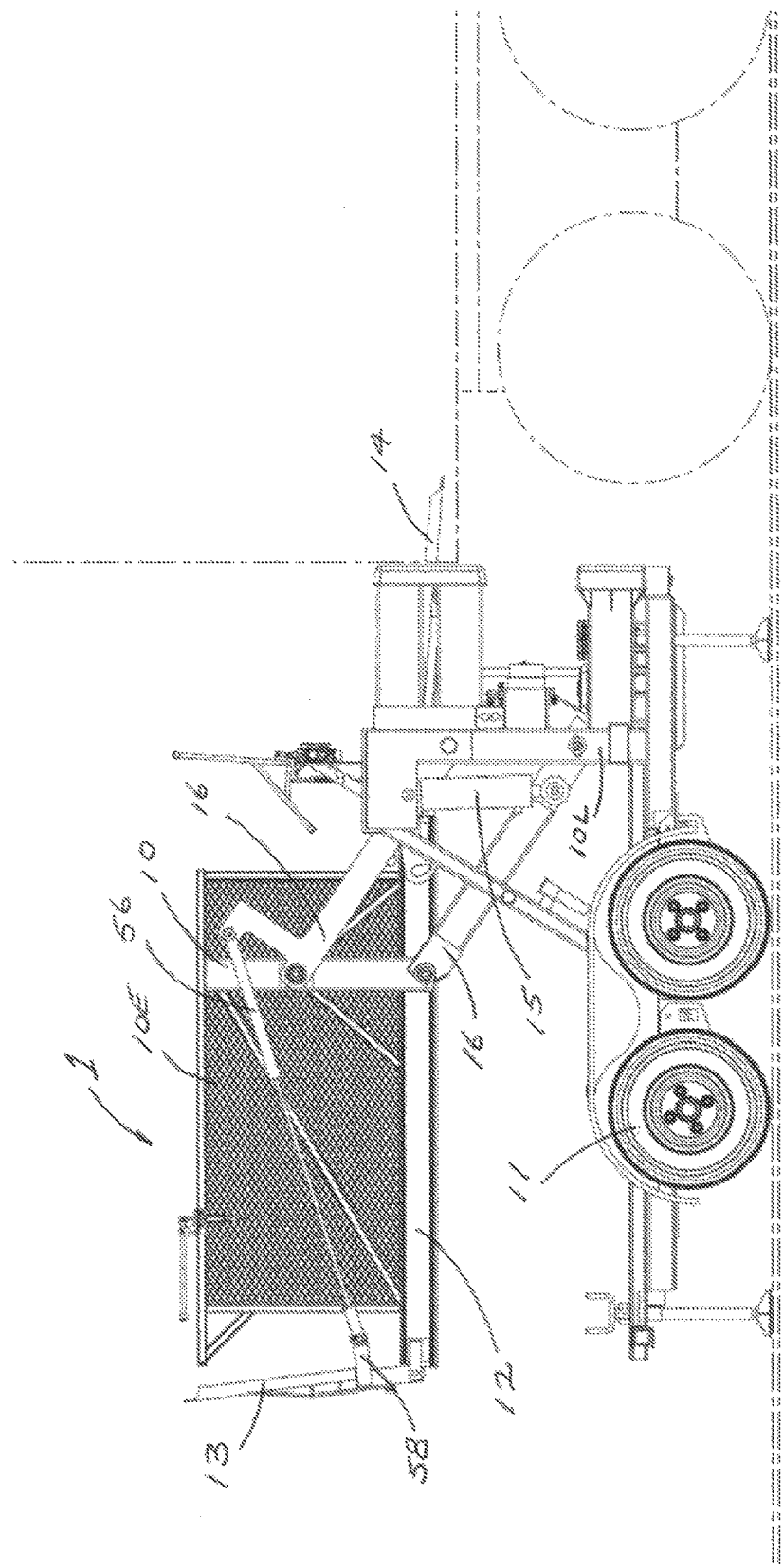
FIG. 6 is another side elevation view of the system shown in FIG. 1, wherein the system is in an off-loading configuration.
Figure 7:
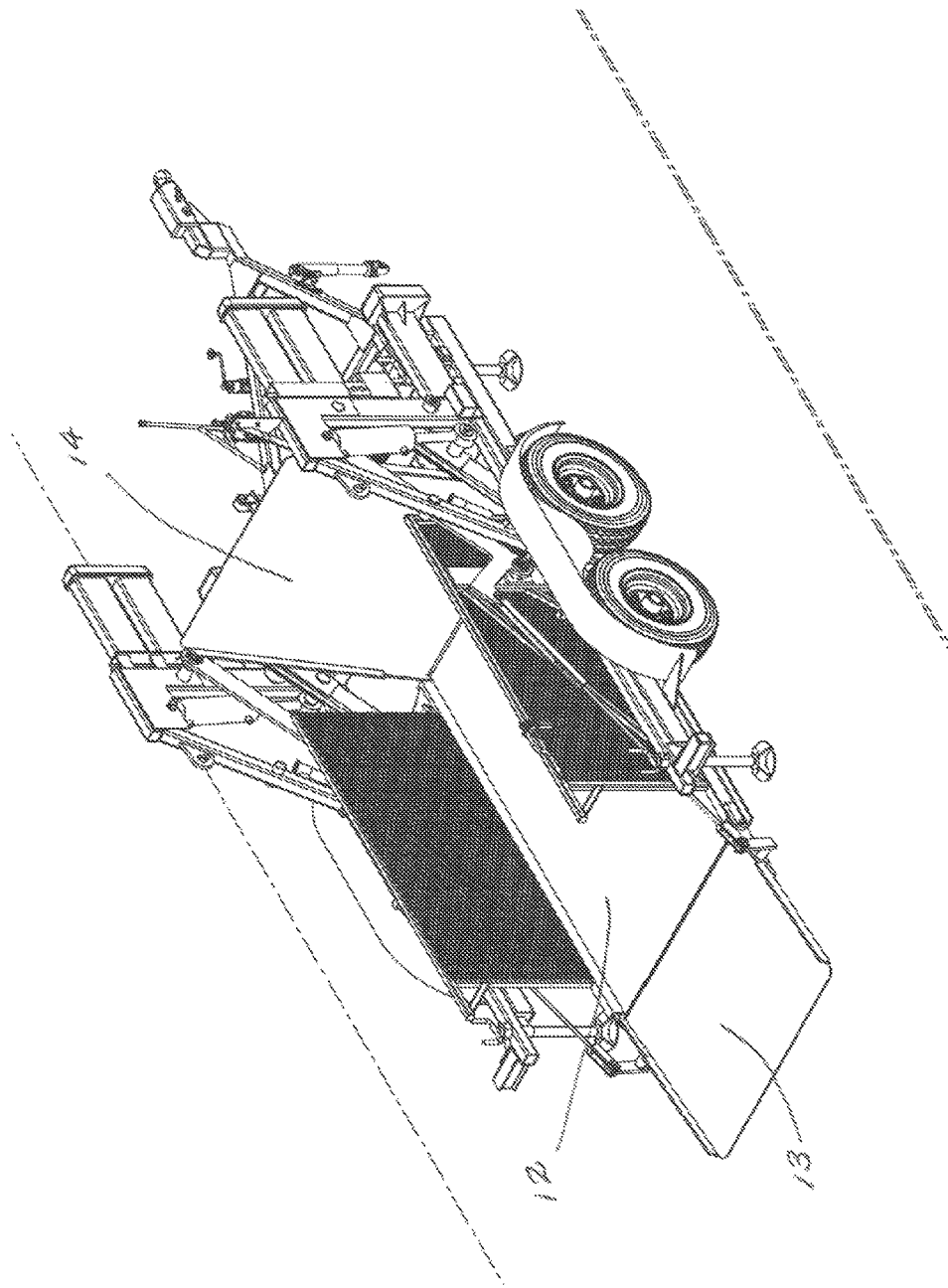
FIG. 7 is another top perspective view of the system shown in FIG. 1, wherein the system is in a stationary position.

The frame 10 can have upper elevated section 10E and lower chassis 10L, as shown in FIG. 6. The embodiment of the apparatus, as shown in FIGS. 1 and 2 for example, includes at least one or two pairs of lifting arms 16, at least one or two pairs of hydraulic cylinders 15, one or more suitable control levers 19, one or more remote control levers 20 and one or more railing structures 17 to keep persons and freight from falling off platform 12. Arms 16 can be elevated or lowered depending upon the position of the platform 12. The lower chassis 10L incorporates a lighting system that complies with governmental requirements (FMVSS 108 standards) for the use of trailer assemblies on public thoroughfares.

Figure 3:
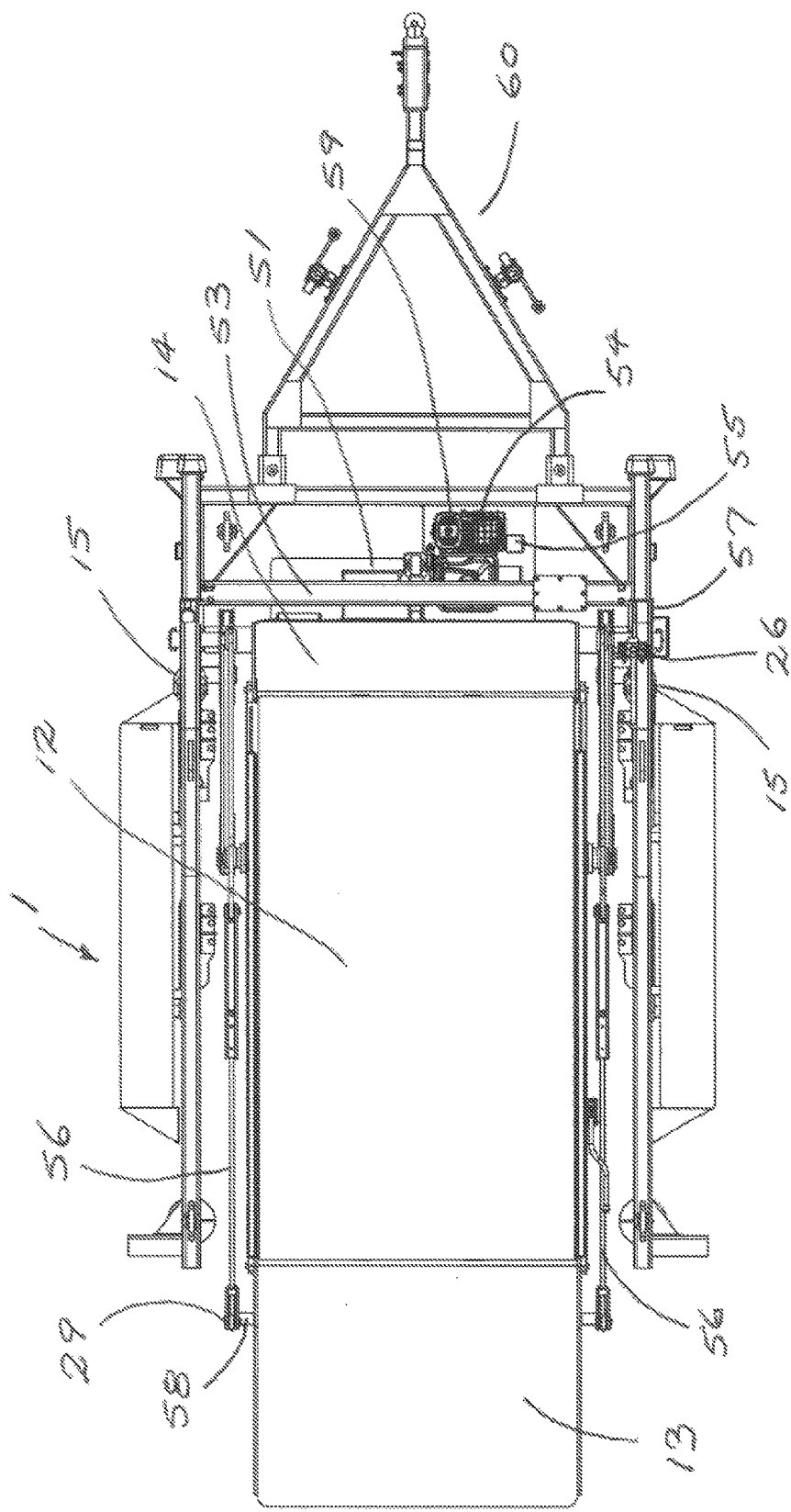
FIG. 3 is a top plan view of the system shown in FIG. 1.
Figure 4:
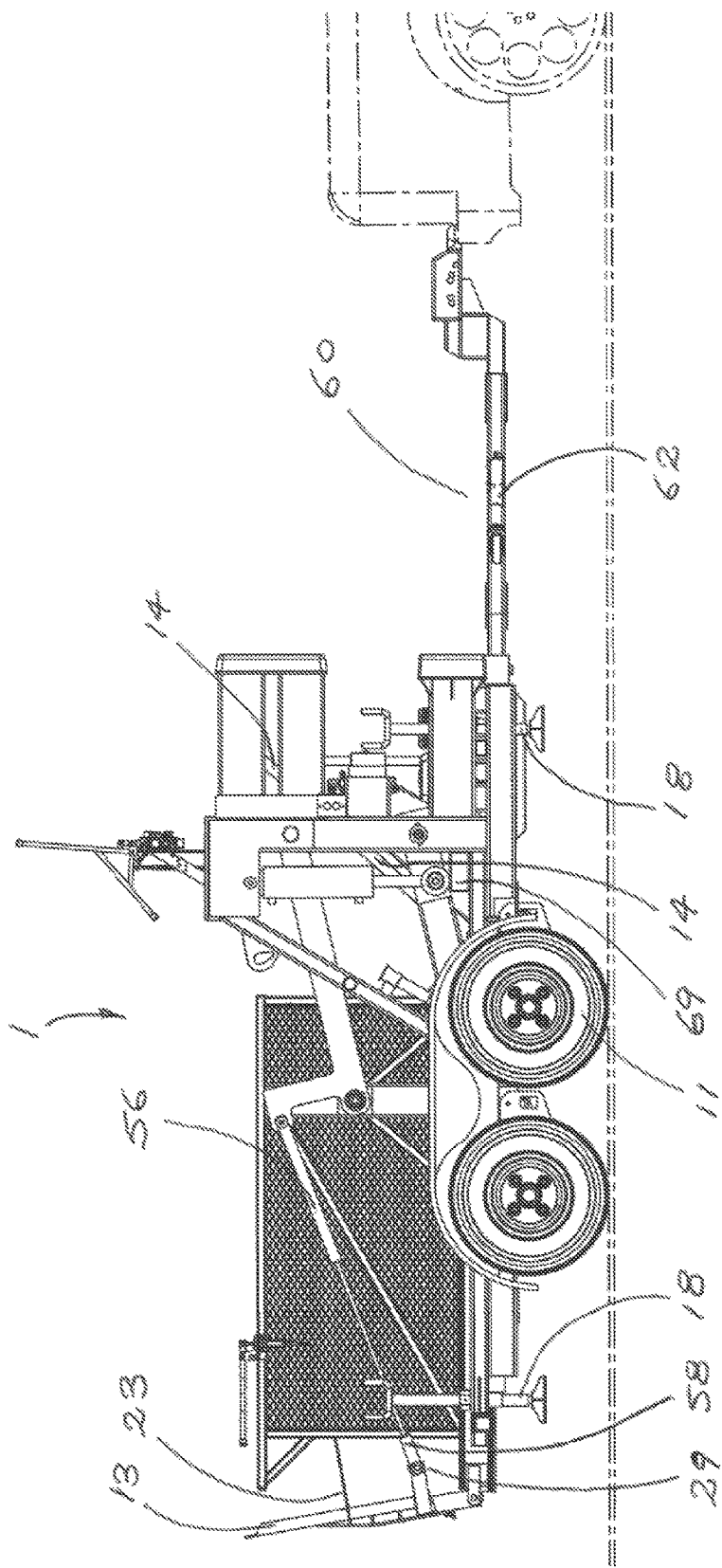
FIG. 4 is another side elevation view of the system shown in FIG. 1, wherein the system is in a towing configuration.

The control levers 19 and 20, in conjunction with the electrical control system (remote key start ignition 57, throttle control solenoid with relay 59, battery 51, and motor 54) shown in FIGS. 1 and 3, and hydraulic control system (control valve 26 with integral overpressure relief functionality, hydraulic pump 55 and hydraulic reservoir 53) also shown in FIGS. 1 & 3 provided the operator with proportional speed control of the motion of the platform with inclusive feathering action for small incremental movement at the end of the ascent and descent cycles. The control levers are mechanically connected to the control valve 26. To raise the platform, either one of the control handles is raised from its neutral position. This motion is directly transmitted to the control valve. The control valve then initiates an electrical control signal to remotely actuate the throttle control solenoid 59 to move the motor 54 to the full throttle position. The motor is directly coupled to the hydraulic pump 55 which draws fluid from the reservoir 53 and generates pressurized fluid that is directed back to the control valve 26. The control valve 26 will pass pressurized fluid, at a rate determined by the position of the control levers, to the associated hydraulic cylinders 15. The hydraulic cylinders then act on the lifting arms 16 to raise the platform 12, the rate at which the platform ascends being determined by the flow rate of the pressurized hydraulic fluid to the cylinders. When the control lever is released, the control valve will close off the fluid flow to the hydraulic cylinders and the platform will cease motion at its current ascended position, at which time the motor will return to the idle condition. To lower the platform, either control lever 19 or 20 is lowered. This motion is directly transmitted to the control valve 26. The control valve will then vent the fluid from the hydraulic cylinders to the reservoir 53 at a rate determined by the position of the control handles. This allows the hydraulic cylinders to return to their initial operating position and in doing so, allow the lifting arms to lower and the platform 12 to descend under the effect of gravity. The rate at which the fluid is vented determines the speed at which the platform 12 descends. The platform descent cycle does not require any action from the motor 54.

The hydraulic system incorporates flow limiting devices that prevent the platform 12 from rapidly descending in the event of a hydraulic line rupture and consequent loss of fluid pressure.

Figure 13:
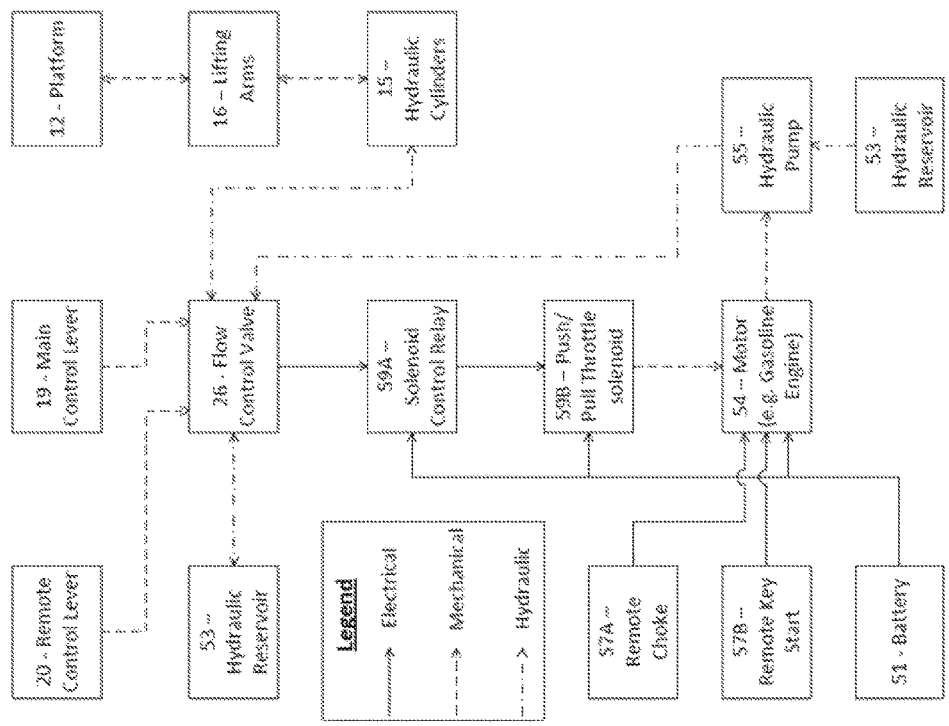
FIG. 13 is a schematic illustration of the control system of the disclosed embodiment.

FIG. 13 is a schematic representation of the self-contained power system and the control system of the embodiment. The self-contained power system utilizes a gasoline powered motor 54, as the power source. A similar arrangement is utilized for diesel powered, LPG/Propane and electric powered embodiments.

In this example, the power source consists of the motor 54 with its associated battery 51 and Remote Key Start Ignition System 57 that includes the Remote Choke 57A and Remote Key Start 57B. To elevate the lift's Platform 12, the Motor 54 is started via the Ignition System 57 and is running at idle speed. To raise the Platform, either the Main Control Lever 19 or the Remote Control Lever 20 is raised. This motion is directly coupled via mechanical linkages to the internal spool within the Flow Control Valve 26. The spool's movement performs two functions: 1) It connects the output of the Hydraulic Pump 55 to the inputs of the Hydraulic Cylinders 15 and 2) It operates an electrical switch that is integral to the Flow Control Valve 26.

The electrical switch is electrically connected to the Solenoid Control Relay 59A which generates an 'energize' control signal that is electrically connected to the Push/Pull Throttle Solenoid 59B. Upon receipt of this signal, the Push/Pull Throttle Solenoid operates and the movement of its plunger is mechanically connected to the throttle of the Motor 54 thereby increasing the Motor's output shaft speed from idle to a higher speed, such as maximum torque speed. Once the Push/Pull Throttle Solenoid 59B is in the 'Energized' position, the Solenoid Control Relay 59A then generates a 'Hold' control signal that is electrically connected to the Push/Pull Throttle Solenoid to hold it in its activated position. The output shaft of motor 54 is mechanically connected to the Hydraulic Pump 55 which then pressurizes fluid drawn from the Hydraulic Reservoir 53. This pressurized fluid is hydraulically connected to the Flow Control Valve 26 which directs the pressurized fluid to the Hydraulic Cylinders 15. The Hydraulic Cylinders are mechanically connected to the Lifting Arms 16 which, under the motion of the Hydraulic Cylinders, are moved upwards and, being mechanically connected to the Platform 12, elevate the platform to the desired height for access to the truck for loading/unloading purposes.

When the Platform 12 has reached the desired elevation, either of the Main Control Lever 19 or the Remote Control Lever 20 is released to its normal neutral position. This motion, when mechanically transmitted to the Flow Control Valve 26, restores the spool within the valve to its neutral position. This movement performs two functions: 1) it isolates the Hydraulic Cylinders 15 thereby trapping pressure within them to maintain the platform in its elevated position and 2) it deactivates the electrical switch within the Flow Control Valve 26, thereby deactivating the Solenoid Control Relay 59A which in turn de-energizes the Push/Pull Throttle Solenoid 59B. This action returns the Motor 54 to its idle speed and the pressurized fluid output from the Hydraulic Pump 55 is directed via the Flow Control Valve 26 to the Hydraulic Reservoir 53.

To lower the platform, either the Main Control Lever 19 or the Remote Control Lever 20 is lowered. This motion is mechanically transmitted to the Flow Control Valve which then vents the pressure from the Hydraulic Cylinders 15 back to the Hydraulic Reservoir 53 thereby allowing the lifting arms to lower and, in so doing, lower the Platform 12.

As described above, platform 12 can include or be attached to two access ramps 13, 14 that are in line with each other and are connected to platform 12 by hinges, for example, and can be folded upward when not in use or when the entire apparatus is moved to another location. Access ramp 13 can connect platform 12 to the dock or ground level, and ramp or bridge 14 can connect platform 12 to the truck floor (shown only by 30 representing the rearmost wall of the enclosed truck). With each of ramps 13 and 14 in its operating position, there is a relatively flat and level surface for the movement of freight thereon from the interior of the truck to platform 12 in its elevated position, and from platform 12 in its lowered position to the facility floor or ground.

A unique feature of the presently disclosed technology is the integrated automatic nature of ramps 13 and 14. Ramps 13 and 14 can be raised and lowered synchronously with the raising or lowering of the platform 12. The position and/or angle of each ramp 13 and 14 are predetermined depending upon the height or position of platform 12. For example, when platform 12 is in its lowest position (see FIG. 2), ramp 13 is automatically in its lowest, folded-outwardly position and ramp 14 is automatically its folded-upwardly position. In this embodiment, as platform 12 is moved upwardly (see FIG. 6), ramp 13 automatically begins to fold upwardly and ramp 14 automatically begins to fold downwardly. When platform 12 is in its highest position (see FIG. 6), ramp 13 automatically extends substantially upwardly (e.g., perpendicularly to the ground surface) and ramp 14 is automatically in its lowest, folded-outwardly position. Thus, in this embodiment, the position and/or angle of ramps 13 and 14 is based on the position or height of platform 12 such that the act of raising and/or lowering platform 12 moves ramps 13 and 14 to predetermined positions. In one embodiment, the apparatus can include one or more sensors, which can be configured to detect the presence or height, for example, of an object, and then raise either or both ramps 13, 14 in accordance with preprogrammed instructions.

Ramps 13 and 14 can be automatically raised or lowered through a linkage arrangement. Ramps 13 and 14 are configured to operate without an individual physically opening and closing them. For example, with respect to ramp 13, a front end of first link 56 can be pivotally or rotationally attached to a portion of frame 10. An opposing second end of first link 56 can be attached to hinge 29, which in turn is pivotally or rotationally attached to upper end of second link 58. In one embodiment, first link 56 can be telescopic. An opposing second end of second link 58 can be fixed to rear ramp 13. Second link 58 can extend generally, substantially or exactly perpendicularly to a plane defined by rear ramp 13. Second link 58 can also be fixed, such as by welding with respect to rear ramp 13. The trailer can include the above-described linkage arrangement on each lateral side thereof, or on only one side thereof.

As another example, with respect to ramp 14, ramp 14 can rest at an angle against first wheel 64 (see FIG. 1), which is located generally above motor 54. As platform 12 is raised, ramp 14 (which can be attached to the platform only via a hinge, for example) continues rolling along first wheel 64 and rotating until it makes contact with a second wheel 66, which is located generally forward and to the right of first wheel 64. This is where the point of contact with ramp 14 shifts from the first wheel 64 to second wheel 66. As platform 12 continues to be raised there will be a point where the distance between the ramp hinge and the ground is equal to the distance between the top of second wheel 66 (where ramp 14 makes contact with second wheel 66) and the ground. At this point ramp 14 will extend generally or substantially horizontal (see FIGS. 6 and 10, for example). The second wheel 66 is itself adjustable in height such that the ramp 14 can be raised to achieve a horizontal position at different heights to accommodate various truck heights.

The apparatus 1 can also include leveling and stabilizing jacks 18 attached to frame 10 for lifting the apparatus off wheels 11 so as to provide a steadier and level elevator apparatus. The jacks may be mechanically screwed down or hydraulically actuated. There may be two, three, four or even more jacks 18 included on or attached to frame 10. Of course, the arrangement of frame 10 supporting wheels 11 and jacks 18 will depend on how much room there is on a given dock and in front of the dock, without taking up excessive truck approach space given the specific location. The weight of the lift and load on the lift is supported by both the jacks on the dock surface and the ground in front of the dock when the invention is positioned there for use.

In one embodiment, the apparatus can include two wheels 11 on each opposing sides of the apparatus 1. In other embodiments, fewer or additional wheels can be removed, added or reconfigured in a different manner. The wheels 11 can be highway grade, meaning they can support the apparatus in moving at fast speeds and/or for long distances on a highway. Additionally or alternatively, the wheels 11 can be configured to support an off-road workload.

Wheels in prior art apparatuses are much smaller (e.g., the size of caster wheels), and not designed for or capable of being moved at high speeds or over long distances while supporting a heavy load. The small wheels of the prior art designs (see, e.g., wheels 11 of U.S. Pat. No. 6,357,990) have been in use for 40 or more years, yet a trailer of the type described herein has not been made with highway grade wheels. Attempting to tow prior art lift apparatuses would quickly destroy the relatively small wheels, which would risk destroying the entire prior art apparatus. While certain prior art trailers may operate satisfactorily in certain situations, they can be difficult or expensive to move long distances, because additional and often expensive equipment is needed to facilitate the move. There has long been a need in the market to more quickly and efficiently transport prior art trailers, but no one until now has designed a system that can fulfill this need. The presently-disclosed technology, thus, satisfies a long-felt, but unmet, need. The presently-disclosed technology allows the apparatus or trailer to be moved from one job to the next in a quick and efficient manner.

The wheels 11 of the embodiment can be inflatable, and can include an inner tube containing air surrounded by tire 50, which can be made of rubber, for example, and inner rim 52, which can be made of a metallic material, for example. Inner rim 52 can be formed of steel or a cast alloy, such as aluminum alley. Alternatively, wheels 11 can be made of different materials and/or configurations. Conventional suspension systems can be used in combination with the preferred embodiment.

As shown in FIG. 6, in one embodiment, wheels 11 can be positioned about or exactly midway between a front edge and a rear edge of the apparatus 1. This positioning of wheels 11 can facilitate or optimize towing of the apparatus 1 at high speeds or for long distances. Wheel position and other configurations can be modified to provide a desired "tongue weight" during towing. In one embodiment, each wheel 11 is rotatably attached to a portion of frame 10, such that an axle does not extend across a width of frame 10 to connect wheels 11 (see FIGS. 8 and 10). In another embodiment, one or more axles may extend across frame 10 to support or connect highway-grade wheels. Each axle, whether it extends across the width of the frame 10 or not, includes a brake assembly for its associated wheel 11, this brake assembly being operated by a brake actuating mechanism contained within the hitch assembly 60. Further, in one embodiment, all or only a portion of the frame 10 can be raised and/or lowered through mechanical, hydraulic or pneumatic means to allow for lift or height adjustment of the frame.

The apparatus can include one or more bumpers 24, which can absorb the shock of a truck backing too fast into the apparatus with the front surface of the frame 10 furnishing the support to hold this invention in one spot when impacted. The apparatus can also include hitch 60 having two stabilizer wheels/supports 62. In one embodiment, stabilizer wheels 62 are significantly smaller than each wheel 11. For example, the radius of stabilizer wheels 62 can be a third, for example, of the radius of each wheel 11. Stabilizer wheels 62 can be pivotally attached to hitch 60, such that stabilizer wheels 62 can be folded upwardly, for example, when not in use (see FIG. 4). In one embodiment, the hitch 60 can be removably attached to the trailer (via pins 61 that extend generally perpendicular to the bed of the trailer) and can facilitate connection of the trailer to the rear of a truck. The hitch 60 is removed, thus allowing a truck to be located in the vicinity of the bumpers 24. Hitch 60 can accommodate a variety of connection apparatus to the towing vehicle with FIGS. 1-10 showing a ball type pull hitch by way of illustration.

A further embodiment can have hitch 60 attached to the opposite end of the trailer to that shown in FIGS. 1-10 to enable the trailer to be maneuvered up to a stationary truck, rather than a truck being maneuvered up to a stationary trailer.

Figure 8:
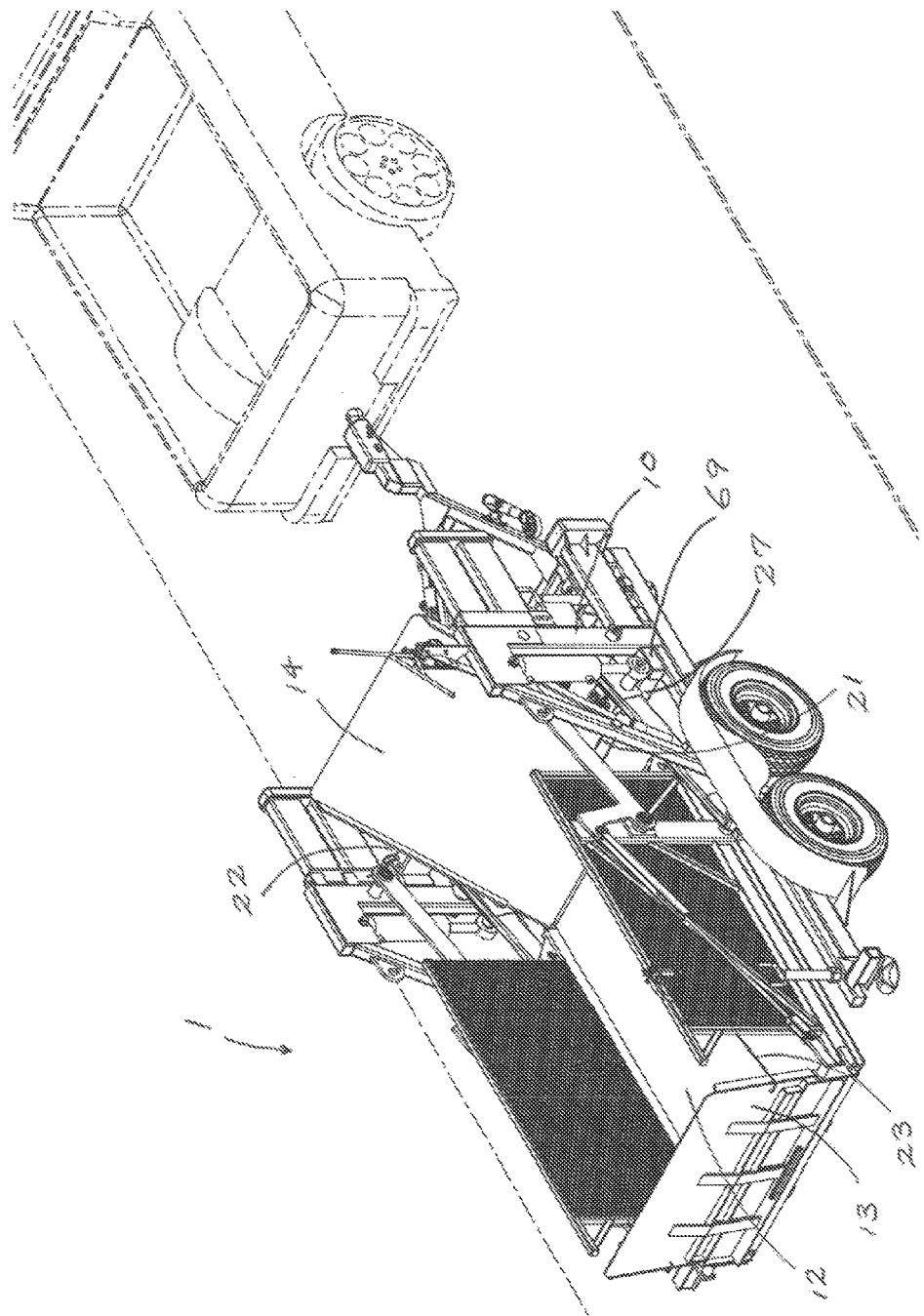
FIG. 8 is another top perspective view of the system shown in FIG. 1, wherein the system is shown being towed by a truck.
Figure 9:
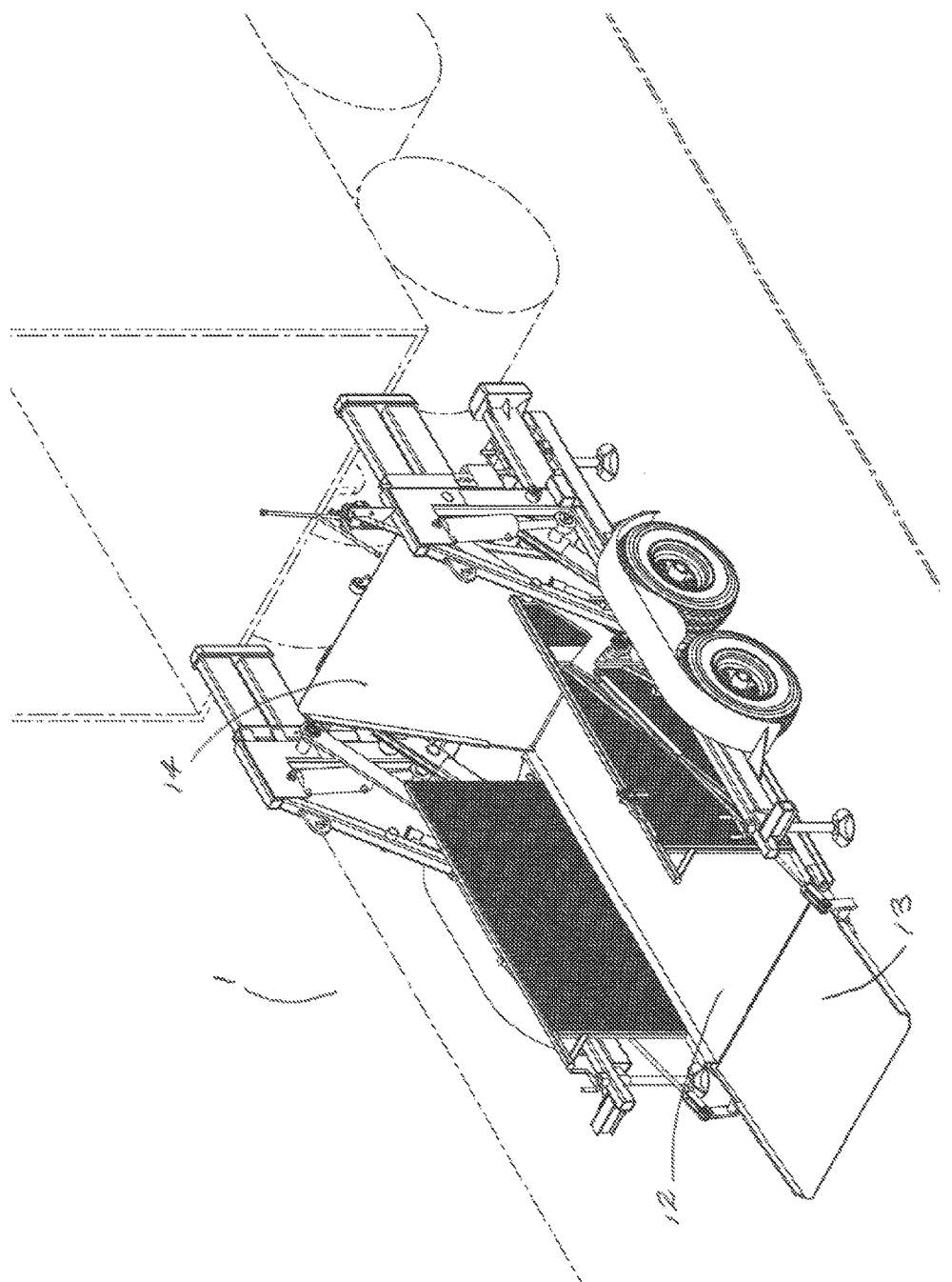
FIG. 9 is another top perspective view of the system shown in FIG. 1, wherein the system is shown in a loading configuration.

The apparatus can include a restraint system 23 on FIG. 8, the purpose of which is to provide a physical connection between the free end of the ramp 13 and the platform's railing structure 17 during transportation of the trailer, in order to restrain the ramp against wind loadings when the trailer is being towed.

The apparatus can include a restraint system 22 shown in FIG. 8, the purpose of which is to provide a physical connection between the free end of the ramp 14 and the frame structure 10 to make the trailer more compact during transportation by towing.

Figure 10:
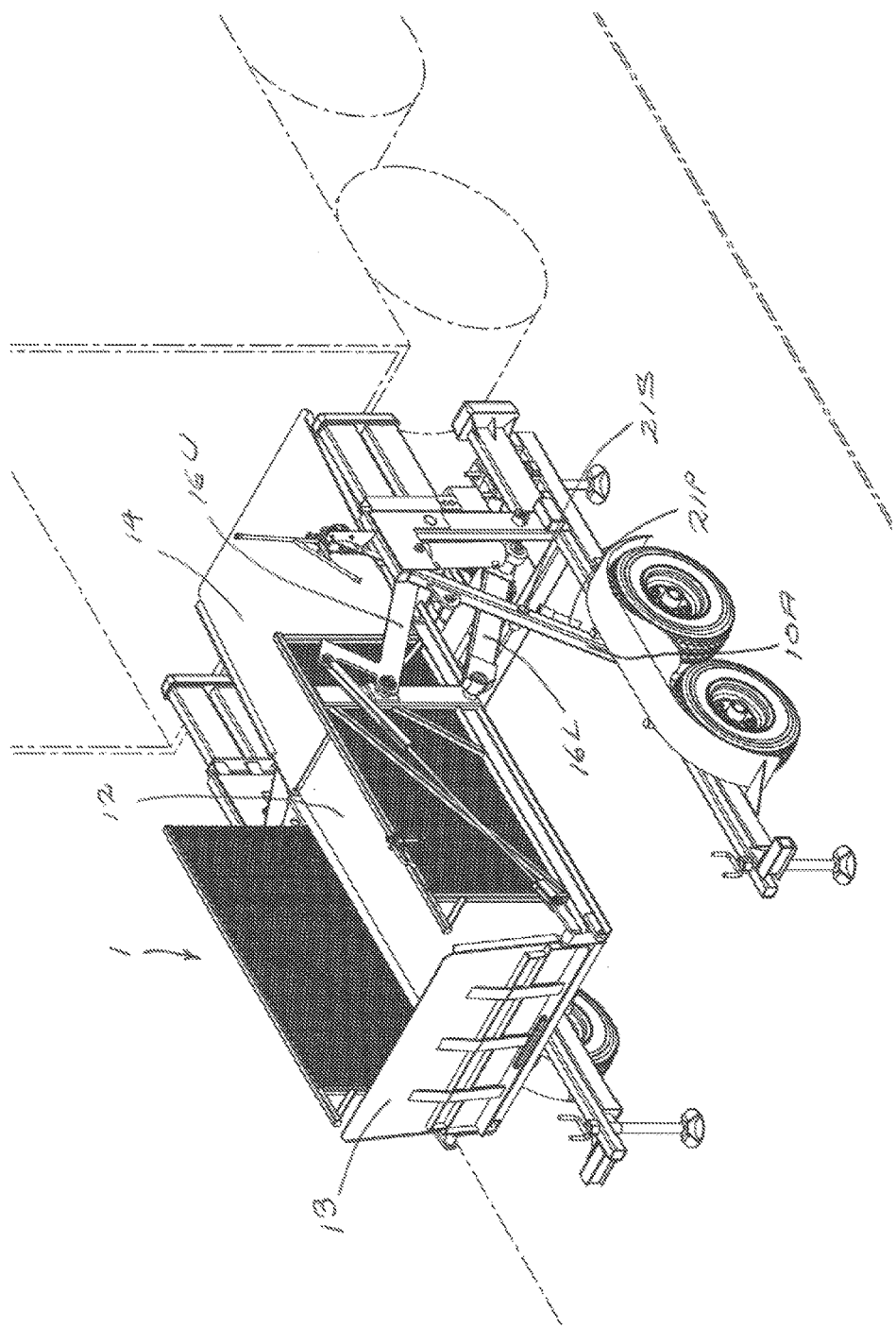
FIG. 10 is a top perspective view of the system shown in FIG. 1, wherein the system is shown in an off-loading configuration.

The apparatus can include a locking system 21 shown in FIGS. 8 & 10, the purpose of which is to provide a physical pin barrier between the platform 12 and the frame 10, one on each side of the frame, that prevents the platform descending from maximum elevation to ground level in order to facilitate safe access beneath the platform if required, e.g. for maintenance purposes.

Referring to FIG. 10, the platform locking pins 21P are stowed in a parking position on the frame side angle support 10A during normal operation. When the platform 12 is to be constrained at maximum elevation, the pins 21P are removed from their parking positions and manually installed into horizontal sleeves 21S located on the frame side angle supports such that they protrude into the operating plane of the lifting arm 16. The lower lifting arm 16L will then rest on the top of the protruding pins 21P.

Figure 11:
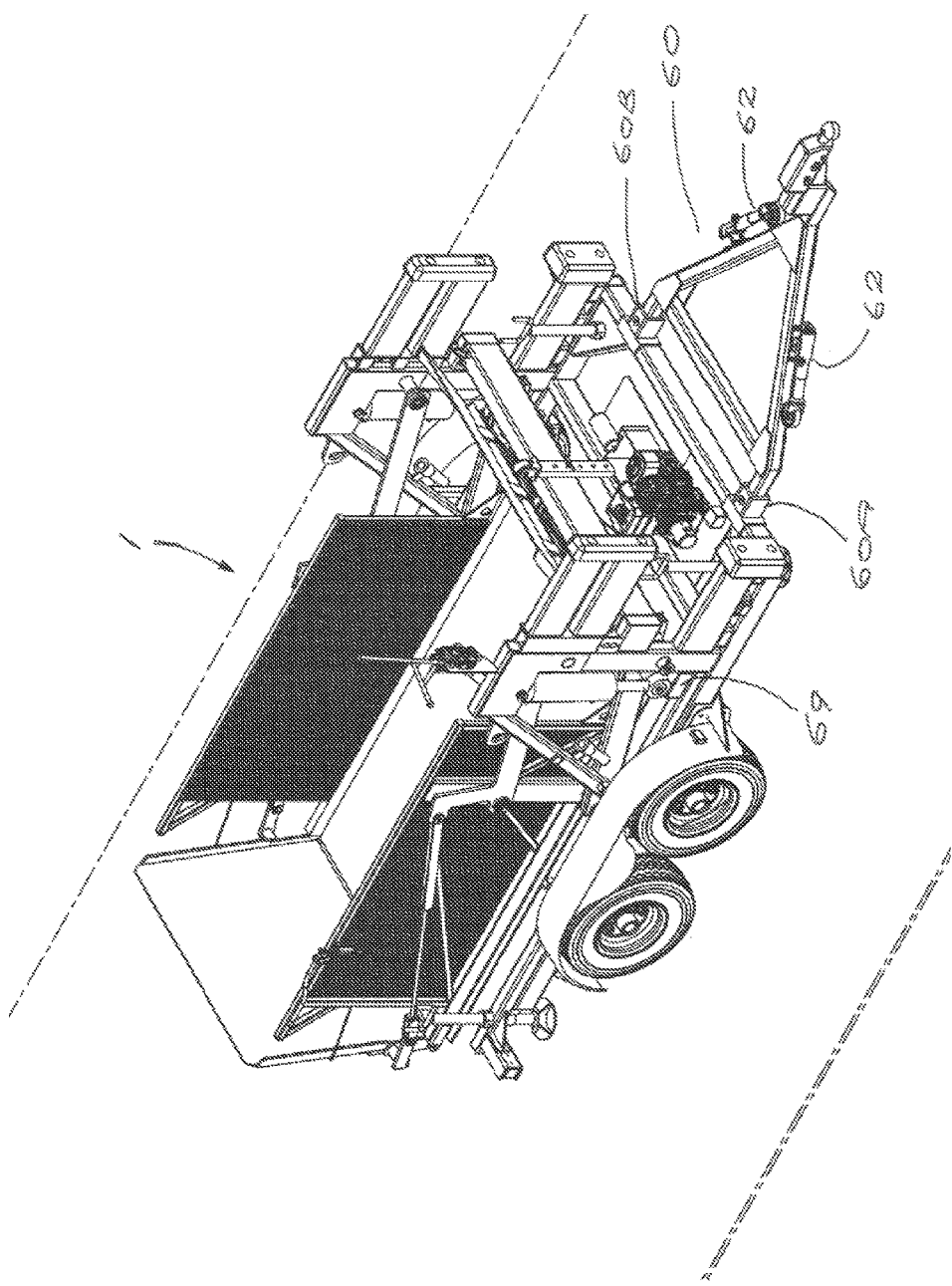
FIG. 11 is a top perspective view of the system shown in FIG. 1 with the hitch in the towing position.

The platform can include a locking system 69 shown in FIGS. 8 & 11, the purpose of which is to provide a physical barrier between the hydraulic cylinders 15 and the lower chassis 10L, one on each side of the frame, that prevents the platform descending to ground level during towing of the apparatus. Referring to FIG. 10, during towing, the blocks of the locking system 69 are installed between the pistons of the hydraulic cylinders 15 and the lower chassis 10L, thereby preventing the hydraulic cylinders from fully extending and allowing the platform to be lowered to the ground via the interconnecting lifting arms 16. To then operate the apparatus, the blocks of the locking system 69 are removed, allowing full extension of the hydraulic cylinders and hence the full range of motion of the platform from ground level up to full height.

A further embodiment can have an obstruction detection system 27 shown in FIG. 8, the purpose of which is to detect a foreign body that may find its way under the platform 12 and alert the platform operator that such foreign body is present and to be removed before exercising the descent function of the platform. Known detectors, such as optical, radar or induction proximity detectors can be used in the obstruction detection system.

Figure 12:
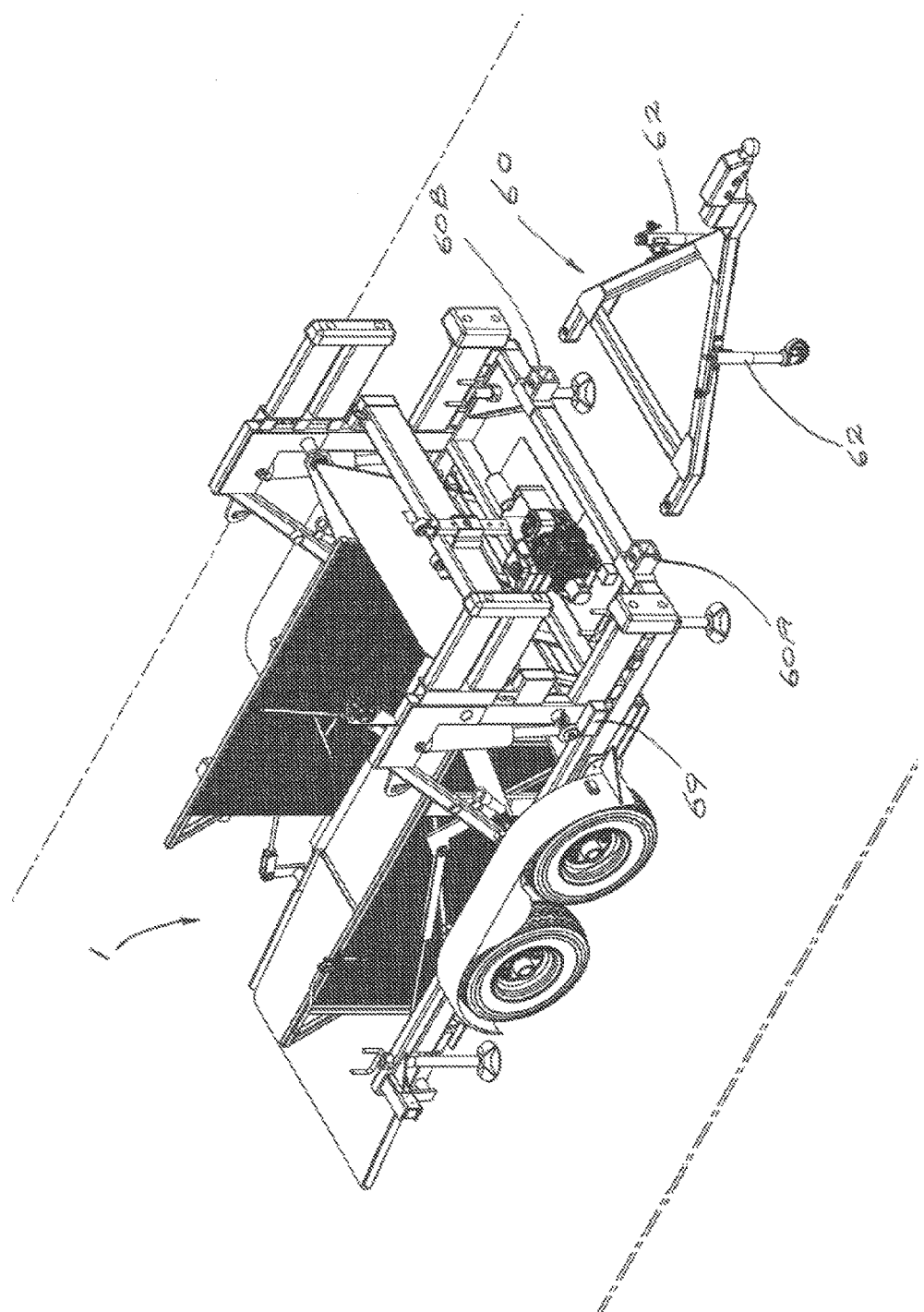
FIG. 12 is a top perspective view of the system shown in FIG. 1 with the hitch removed from the apparatus.

FIG. 11 shows hitch assembly 60 in position suitable for towing the trailer by a standard truck. FIG. 12 shows the hitch assembly 60 fully disconnected from the apparatus 1 by removing the connection pins 60a and 60b, and moved away from the apparatus on the two hitch stabilizer wheels 62.

FIG. 1 shows the pressure transfer device 28 installed on Frame 10. This device is connected between the input to the hydraulic cylinder 15 and the brake line located on the lower chassis 10L. If the platform 12 is resting on the ground or either of the locking systems 21 or 69 is activated, then the pressure to the hydraulic cylinder is zero and this zero pressure is transferred to the brake system via device 28. This enables the braking system to operate normally via the hitch (towbar) 60, thereby allowing apparatus 1 to be towed and its brakes operate when required during towing. If the platform 12 is either in use, during either ascent or descent cycles to transfer goods between two surfaces of different heights, or the platform 12 is in an elevated position with the platform locking system 21 deactivated, or the apparatus is configured for towing with the Locking System 69 activated, then the pressure required to operate the hydraulic cylinders 15 is transferred via the pressure transfer device 28 to the braking system, thereby locking the wheels of the trailer. This prevents the trailer from being moved either during loading/unloading operations, or when the platform 12 is elevated and not safely restrained for transportation. The pressure transfer device 28 provides an isolation barrier between the fluids contained within the hydraulic control system and the braking system, thereby ensuring that there is no cross-contamination of fluids between the two otherwise independent systems.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A towable and repositionable lifting apparatus configured to transfer freight between two surfaces of different heights, the apparatus comprising:
   a loading platform;
   a first ramp pivotably coupled to a first end of the loading platform;
   a second ramp pivotably coupled to a second end of the loading platform;
   a frame;
   a lifting mechanism coupling the frame to the loading platform and configured to move the platform vertically with respect to the frame; and
   a linkage system coupled to the frame and the loading platform and configured to pivot the first ramp and the second with respect to the platform synchronously with vertical movement of the platform with respect to the frame.

2. The apparatus of claim 1, wherein the lifting apparatus meets government requirements (FMVSS 108 standards) for transportation on public thoroughfares.

3. The apparatus of claim 1 wherein:
   the first ramp is located rearward of the loading platform and the linkage system is configured to maintain a horizontal orientation of the first ramp when the loading platform is at ground level and an inclined orientation when the loading platform is raised; and
   the second ramp is located frontward of the loading platform and the linkage system is configured to maintain an inclined orientation of the second ramp when the loading platform is at ground level and a horizontal orientation when the loading platform is at a loading height.

4. The apparatus of claim 3, wherein the linkage system comprises at least one adjustable height apparatus and the second ramp is moved by maintaining contact with the at least one adjustable height apparatus.

5. The apparatus of claim 1, further comprising:
   a plurality of stabilizing jacks attached to the frame and configured to stabilize the frame structure during a loading operation.

6. The apparatus of claim 1 wherein the lifting mechanism comprises at least one pair of lifting arms and corresponding hydraulic cylinders, the lifting arms and the hydraulic cylinders being coupled to the loading platform.

7. The apparatus of claim 6 further comprising a control system operatively coupled to the lifting mechanism, the control system including:
   a power source;
   at least one control actuation element;
   at least one hydraulic cylinder;
   a flow control valve having an internal spool and an integral electric switch;
   a hydraulic pump coupled to the power source;
   a solenoid control relay coupled to the electric switch; and
   a throttle solenoid;
   wherein actuation of the control action element causes the power source to open the flow control valve by moving the internal spool thereby coupling the hydraulic pump to the hydraulic cylinders and operating the electric switch to close the solenoid control relay and energize the throttle solenoid to increase the power from the power source and hold the throttle solenoid in an activated position and thereby raise the loading platform; and
   wherein when the loading platform reaches a desired elevation, the control actuation element is deactivated to restore the spool to a neutral position to isolate the hydraulic cylinders to thereby maintain the loading platform at the desired elevation, and deactivate the electric switch and the solenoid control relay to thereby de-energize the throttle solenoid and reduce the power demand on the power source.

8. The apparatus of claim 1, further comprising at least two wheels coupled to frame.

9. The apparatus of claim 1, further comprising a towing hitch coupled to the frame.

10. The apparatus of claim 1, further comprising a brake mechanism coupled to at least one of the wheels.

11. The apparatus of claim 10 wherein the brake mechanism is automatically operated whenever the lifting mechanism is in use in order to stabilize the operation of the apparatus and prevent the apparatus from being towed/moved either during operation or if the apparatus is not correctly configured to be towed.

12. The apparatus of claim 1, further comprising an obstruction detection system for detecting a foreign body under the platform and alerting an operator.

13. The apparatus of claim 1, wherein the lifting mechanism comprises:
at least one lever; and
a proportional speed control operatively coupled to the at least one lever to regulate the speed of vertical motion of the platform based on a position of the at least one lever.

14. The apparatus of claim 13, wherein the lifting mechanism further comprises:
a hydraulic lift mechanism; and
a flow control device operatively coupled to the at least one lever and the hydraulic lift mechanism.

15. The apparatus of claim 13, wherein the flow control device comprises:
and electrical switch electrically connected to a solenoid control relay which generates an energize control signal that is electrically connected to a throttle solenoid that is coupled to the hydraulic lift mechanism; and
wherein, in response to receipt of the energize control signal, the throttle solenoid is activated to operate and movement of a plunger of the throttle solenoid, which is mechanically connected to a throttle of a motor, thereby increasing the speed of an output shaft of the motor from idle to a higher speed; and
wherein, when the throttle solenoid is in the energized position, the solenoid control relay generates a hold control signal that is electrically connected to the throttle solenoid to hold it in its activated position.

16. The apparatus of claim 14 wherein the hydraulic lift mechanism comprises:
at least one hydraulic cylinder; and
a mechanism for isolating the at least one hydraulic cylinder to trap pressure within the at least one hydraulic cylinder and thereby maintain the platform at an elevated position.

17. The apparatus of claim 1, wherein the linkage system is operative to raise and lower the first and second ramps in a predetermined manner based on the height of the platform.

18. The apparatus of claim 17, wherein the linkage system comprises at least one sensor configured to sense the height of the platform.

19. A method for making a towable and repositionable apparatus for transferring freight between two surfaces of different heights, the method comprising:
forming a loading platform;
forming a first ramp pivotally coupled to a first end of the loading platform;
forming a second ramp pivotally coupled to a second end of the loading platform;
a frame; and
forming a lifting mechanism coupling the frame to the loading platform and configured to move the platform vertically with respect to the frame;
forming a linkage system coupled to the frame and the loading platform and configured to pivot the first ramp and the second with respect to the platform synchronously with vertical movement of the platform with respect to the frame;
attaching a plurality of stabilizing jacks to the frame, the stabilizing jacks being configured to stabilize the frame during a loading or unloading operation;
attaching at least two wheels coupled to the frame; and,
forming a brake mechanism coupled to at least one of the at least two wheels configured to automatically prevent the apparatus from being either towed/moved during operation of the platform, or if the mechanism is not correctly configured to be towed; and
coupling a towing hitch to the frame.

20. The method of claim 19, wherein the lifting apparatus meets government requirements (FMVSS 108 standards) for transportation on public thoroughfares.

* * * * *